United States Patent
Ossowski

(10) Patent No.: US 9,292,898 B2
(45) Date of Patent: Mar. 22, 2016

(54) CONDITIONAL END OF THREAD MECHANISM

(71) Applicant: Intel Corporation, Santa Clara, CA (US)

(72) Inventor: Przemyslaw Ossowski, Chwaszczyno (PL)

(73) Assignee: Intel Corporation, Santa Clara, CA (US)

( * ) Notice: Subject to any disclaimer, the term of this patent is extended or adjusted under 35 U.S.C. 154(b) by 198 days.

(21) Appl. No.: 13/834,540

(22) Filed: Mar. 15, 2013

(65) Prior Publication Data

US 2014/0267272 A1 Sep. 18, 2014

(51) Int. Cl.
*G06T 1/20* (2006.01)
*G06F 9/44* (2006.01)
*G06T 15/00* (2011.01)

(52) U.S. Cl.
CPC ... *G06T 1/20* (2013.01); *G06F 9/44* (2013.01); *G06T 15/005* (2013.01); *G06T 2200/28* (2013.01)

(58) Field of Classification Search
CPC .......... G06F 9/3867; G06T 1/20; G06T 15/06
USPC ....................................................... 345/426
See application file for complete search history.

(56) References Cited

U.S. PATENT DOCUMENTS

| | | | |
|---|---|---|---|
| 6,286,027 B1 * | 9/2001 | Dwyer et al. ................. | 718/107 |
| 6,646,639 B1 * | 11/2003 | Greene et al. ................ | 345/422 |
| 6,687,812 B1 * | 2/2004 | Shimada ....................... | 712/230 |
| 2003/0126379 A1 * | 7/2003 | Kaushik et al. .............. | 711/150 |
| 2010/0042981 A1 * | 2/2010 | Dreyer et al. ................ | 717/146 |
| 2010/0141666 A1 * | 6/2010 | Christopher et al. ......... | 345/520 |
| 2011/0080415 A1 * | 4/2011 | Duluk et al. ................. | 345/506 |
| 2012/0069021 A1 * | 3/2012 | Son et al. .................... | 345/426 |
| 2012/0262493 A1 * | 10/2012 | Tsai et al. .................... | 345/667 |
| 2012/0304194 A1 * | 11/2012 | Engh-Halstevdt et al. ... | 718/106 |
| 2014/0168228 A1 * | 6/2014 | Luebke et al. ............... | 345/505 |

FOREIGN PATENT DOCUMENTS

GB 2511176 A 8/2014

OTHER PUBLICATIONS

Combined Search and Examination Report received for United Kingdom Patent Application No. 1403933.3, mailed on Sep. 19, 2014, 5 pages.

(Continued)

*Primary Examiner* — James A Thompson
*Assistant Examiner* — Hai Tao Sun
(74) *Attorney, Agent, or Firm* — International IP Law Group, P.L.L.C.

(57) ABSTRACT

A graphics processing unit, method, computer readable media, and system are described herein. The graphics processing unit includes at least one execution unit, the execution unit configured to execute a shader. The shader includes instructions that causes the execution unit to process a plurality of pixels in parallel until each of the plurality of pixels is discarded and execution of a last write instruction, and execute a conditional end of thread instruction after each of the plurality of pixels is discarded and after execution of the last write instruction, wherein execution of the conditional end of thread instruction is to terminate the thread.

24 Claims, 8 Drawing Sheets

(56) References Cited

OTHER PUBLICATIONS

Ellis, Sean, "Killing Pixels—A New Optimization for Shading on ARM Mali GPUs", ARM Mali Graphics, ARM Connected Community, Aug. 8, 2013, 4 pages. Also Available at : http://community.arm.com/groups/arm-mali-graphics/blog/2013/08/08/killing-pixels--a-new-optimization-for-shading-on-arm-mali-gpus.

* cited by examiner

250

300

CONDITIONAL END OF THREAD MECHANISM

BACKGROUND ART

One or more shaders may execute on a processor in order to render audio or video on a computing system. In some cases, a shader is a piece of code that typically executes as part of a graphics subsystem. Shaders can be used to apply various effects to images rendered by the graphics processing unit (GPU) rendering pipeline. Shaders may execute computations for pixels in various computing architectures, such as a single instruction, multiple data (SIMD) based architecture. Using a plurality of execution units, a GPU can execute several threads to process instructions of a shader on a plurality of pixels. In this manner, multiple pixels can be processed in parallel.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
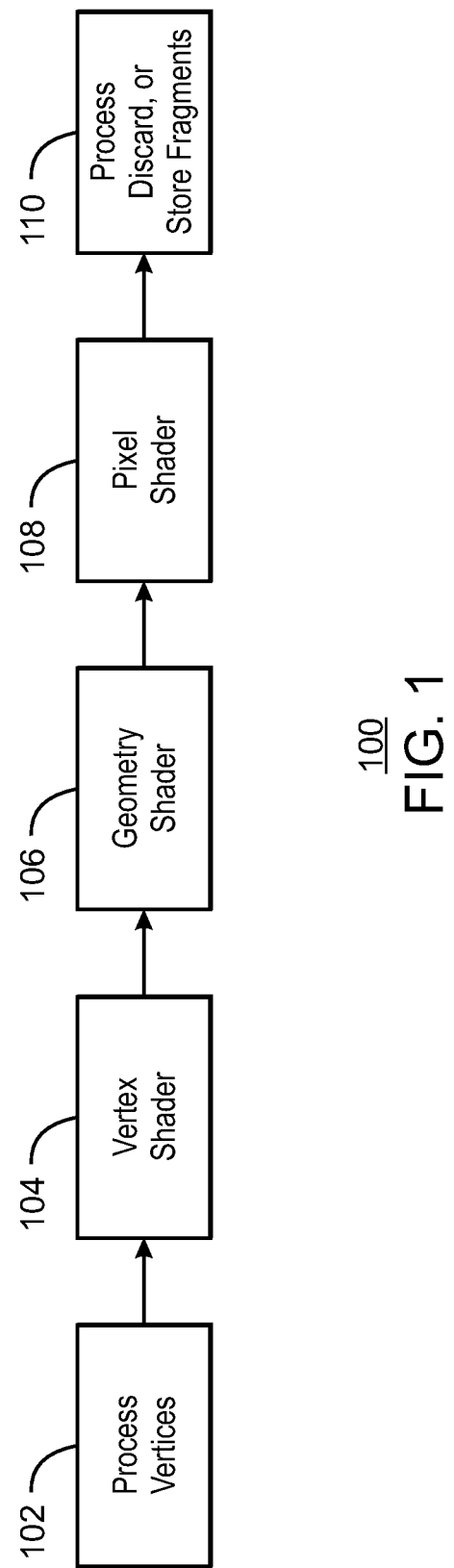
FIG. 1 illustrates a graphics rendering pipeline, in accordance with an embodiment.

As discussed above, threads may be processed in parallel. Each thread may process multiple pixels using an SIMD-based computing architecture. Graphics programs, such as shaders, can dynamically kill a subset or all pixels of a thread by executing a Discard Instruction. The Discard Instruction indicates that the results of computations for the pixels to be killed are not written to a particular output buffer. The output buffer not written to as a result of the Discard Instruction is dependent on the application programming interface (API) used to write the shader. For example, using DirectX, the Discard Instruction applies to an output buffer named Render Target. Using OpenGL, the Discard Instruction applies to an output buffer named Color Attachment. After the Discard Instruction, pixels affected by the Discard Instruction are still processed by the shader, even though they will not be written to an output buffer. The processing of pixels after the Discard Instruction can waste processing cycles as well as unnecessarily consume power.

Embodiments described herein provide a conditional end of thread mechanism. In some embodiments, the end of thread mechanism is an end of thread instruction that is injected into a shader by a shader compiler. Verification code may also be injected into the shader. The verification code verifies the status of each of a plurality of pixels. If all pixels of the plurality of pixels have been discarded and are not written to any other buffer, the thread may be terminated by the conditional end of thread instruction. By verifying the discarded pixels, the end of thread mechanism may be a conditionally executed based upon the status of the pixels. System performance may increase by saving processing cycles when the thread is terminated. Additionally, system power may also be saved. In some embodiments, the Discard Instruction, defined in specifications like DirectX or OpenGL, is related to processing pixels and allows for a conditional indication if results of computations for given pixel should eventually be written to output buffer known as Render Target (DirectX) or Color Attachment (OpenGL).

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the inventions. The various appearances of "an embodiment," "one embodiment," or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

FIG. 1 illustrates a graphics rendering pipeline 100, in accordance with an embodiment. Although the pipeline described herein contains certain elements, a graphics pipeline may contain more or less elements than those described herein. The graphics rendering pipeline 100 is used for exemplary purposes. A pipeline can refer to a set of linked computing processes. Data is sent as input to the first process in the pipeline, the output of each process is sent to the next process as input until data has exited the linked set of processes.

Graphics data is typically sent to a GPU as a set of vertices that forms the geometry of a two dimensional (2D) or three dimensional (3D) image. The vertices may be used to form a primitive representation of the geometry of the 2D or 3D images. The primitives include points, triangles, and lines. At block 102, vertices are processed. The initial processing of vertices includes, but is not limited to determining the lighting for each vertex as well as determining the types of transformations to be applied to each vertex. Light sources may be defined by their location in the image. Other properties, such as chrominance, reflectance, and luminance may also be determined.

At block 104, a vertex shader may be used to transform the position of each 3D vertex from to a 3D coordinate space to a 2D coordinate space. At block 106, a geometry shader may be used to generate new primitives from the primitives originally sent to the graphics rendering pipeline. At block 108, a pixel shader may be used to compute colors and other attributes of the fragments within a scene. Fragments occur as the scene is drawn and the primitives are rasterized into fragments. In examples, the fragment attributes may be interpolated from the vertices of a primitive. At block 110, the fragments may be processed, discarded, or stored in an output buffer.

The pixel data processed by the pixel shader can be any sort of data. In some examples, the pixel data is any data the specifications of DirectX or OpenGL allow as input and output to the pixel shader. Accordingly, the pixel shader is executed on a per pixel basis, and can take as input any parameters such as position, color, lighting, or any other parameter used to define a characteristic for given pixel. In embodiments, the pixel data can be a set of such parameters. During execution, the pixel shader computes output parameters based on the input parameters. In embodiments, the input parameters and the output parameters can be different. For example, based on two input of parameters position and color, the pixel shader may compute a lighting value as an output parameter. The pixel shader may write the values of the output parameters to an output buffer, such as the Render Target.

A processor such as a central processing unit (CPU) or a graphics processing unit (GPU) may be used to execute the graphics rendering pipeline 100 within a system. However, embodiments can be used in any processing system that permits parallel processing of pixels or other data. Although embodiments described herein execute the graphics rendering pipeline using a GPU, any processing unit may be used. In some embodiments, the GPU may be a single instruction, multiple data (SIMD) processor. Accordingly, the GPU includes a plurality of execution units that can operate on several threads in parallel. Furthermore, computing systems may have different instruction widths for SIMD processing. Each SIMD processor may include a number n of channels, and be referred to as an n-channel SIMD processor. The instruction widths are used to accommodate processing n pixels within a thread in parallel. The value of n is typically, eight, sixteen, thirty-two, or sixty-four. By processing multiple pixels in parallel, an SIMD-based GPU can use the parallelism of the graphics data to efficiently process the data. In some embodiments, workloads, such as camera input, print, and display imaging workloads are processed using an SIMD-based GPU. Alternatively, a system on a chip (SOC) may implement SIMD using single instruction multiple thread (SIMT) processors. An SIMT processor includes SIMDs units running in parallel.

In examples, an API may be used render 2D or three dimensional 3D graphics on a graphics processor. The APIs include, but are not limited to, DirectX and OpenGL. During the execution of the thread, the scene may be modified, transformed, or otherwise changed such that the pixels of a thread may not be written to an output buffer. In examples, the Discard Instruction can be used to indicate that pixels will not be written to a particular output buffer when using the DirectX or OpenGL APIs. Discard Instructions are typically performed conditionally, where a subset of the pixels processed by a single thread are discarded with each Discard Instruction. In DirectX, the Discard Instruction applies to pixels that are to be written to an output buffer named Render Target. Similarly, in OpenGL, the Discard Instruction applies to pixels that are to be written to an output buffer named Color Attachment. Accordingly, when a Discard Instruction is applied to one or more pixels, the one or more pixels from the thread will not be written to an output buffer. However, after the Discard Instruction, the pixels are processed until the thread is terminated. As a result, even after a Discard Instruction has occurred within a thread, the pixels within the thread are processed until the thread reaches the end of its processing, even though the resulting processed pixels will not be written to an output buffer. Processing discarded pixels can waste power and processing time.

Figure 2A:
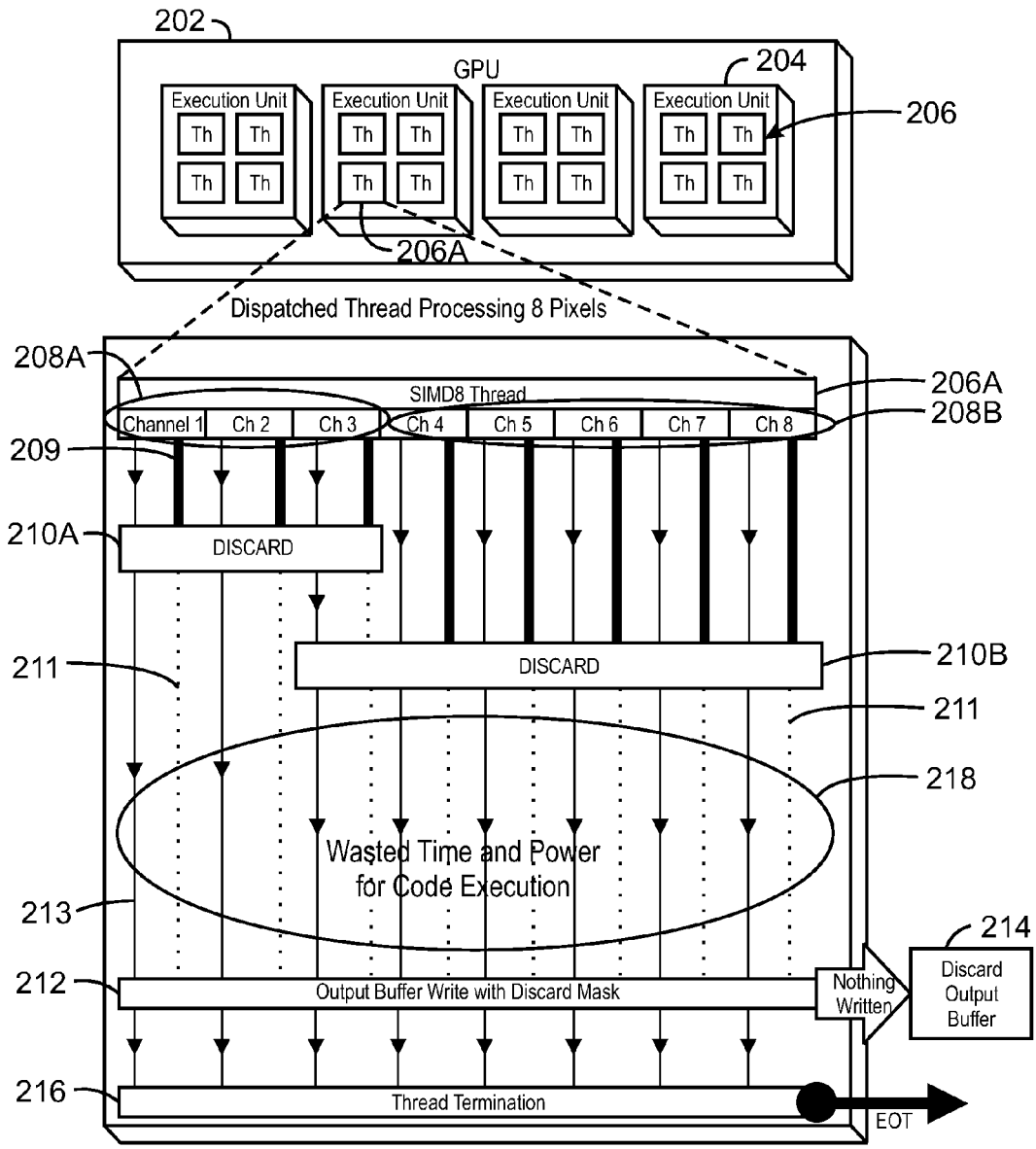
FIG. 2A is a diagram showing a manner of discarding pixels, in accordance with an embodiment.

FIG. 2A is a diagram 200 showing a manner of discarding pixels, in accordance with an embodiment. A GPU 202 includes several execution units 204. Each execution unit executes a plurality of threads 206. In this example, each execution unit processes four threads 206. As described above, each thread executes on the data of a plurality of pixels 208A and pixels 208B in parallel. In FIG. 2A, each thread includes eight of pixels 208A and pixels 208B, with each pixel processed by a channel of the SIMD processing unit. All pixels 208A and pixels 208B may be processed using a graphics rendering pipeline, such as the graphics rendering pipeline 100.

One of each of a plurality of solid thin lines with inverted triangles, such as the line at reference number 213, corresponds to each of the pixels 208A and pixels 208B. Each solid thin line with inverted triangles 213 represents the processing of the corresponding pixels 208A and pixels 208B. One or more Discard Instructions 210 may occur during the execution of the thread. For example, a first Discard Instruction 210A occurs during the processing of the first three pixels 208A. The first Discard Instruction 210A does not apply to the last five pixels 208B. Accordingly, a solid line for each of the pixels 208A, such as the solid line 209, stops at the Discard Instruction 210A. Each of all pixels 208A and pixels 208B has a corresponding solid line, such as the solid line at reference number 209. Each solid line 209 represents the status of the pixel data as being processed in order to write the pixel data to a buffer, such as the discard output buffer 214 or any other buffer. The solid line 209 for each of the pixels 208A is stopped at the Discard Instruction 210A, as the pixel data for the pixels 208A is not processed with the expectation of writing the pixel data from the pixels 208A to the discard output buffer 214, after the Discard Instruction 210A is to the pixels 208A where the solid lines 209 end. A plurality of dotted lines 211 that correspond to each of the pixels 208A begins after the Discard Instruction 210A. Each dotted line 211 after the Discard Instruction 210A indicates the status of the pixel data as not being written to a buffer, such as the discard output buffer 214 or any other buffer. However, each solid thin line with inverted triangles 213 that represents the processing of the corresponding pixels 208 continues after the Discard Instruction 210A, even though the status of the pixel data has changed to not being written to a buffer as indicated by each dotted line 211 that corresponds to each of the pixels 208A. This illustrates that the pixel data of the pixels 208A is processed after the first Discard Instruction 210A.

A second Discard Instruction 210B occurs during the subsequent processing of the pixels 208B. The solid line 209 for each of the pixels 208B is stopped at the Discard Instruction 210B, where the solid lines 209 for each of the pixels 208B indicate that the pixel data will be written to the discard output buffer 214. After the Discard Instruction 210B, the dotted lines 211 for the pixels 208B after the second Discard Instruction 210B indicate that the pixel data for each of the pixels 208B will not be written to a buffer. However, each solid thin line with inverted triangles 213 that represents the processing of the pixels 208B continues after the second Discard Instruction 210B, even though the status of the pixels 208B has changed to not being written to a buffer as indicated by each dotted line 211 that corresponds to the pixels 208B. Accordingly, after the Discard Instruction 210A and the Discard Instruction 210B, the pixel data of all pixels 208A and pixels 208B is processed, even though none of the pixel data of pixels 208A and pixels 208B will be written to a buffer.

An output buffer write with discard mask 212 occurs during the execution of thread 206A to output the data of the pixels 208A and pixels 208B that has not been discarded. Since all pixels 208A and pixels 208B were discarded using the Discard Instruction 210A and the Discard Instruction 210B, no data is written to the discard output buffer 214. In some examples, the Discard Instruction applies to pixels that are written to a particular buffer. Specifically, using DirectX, the Discard Instruction applies writes to the Render Target Buffer. Similarly, in OpenGL, the Discard Instruction applies writes to the Color Attachment Buffer.

The thread is terminated at reference number 216 when the thread reaches the end of processing. Before the render target write at block 212 and the thread termination at reference number 216, the threads are executed, even though the resulting processed pixels will not be used due to the Discard Instruction 210A and the Discard Instruction 210B. This results in as waste of execution time and power as shown at block 218.

Figure 2B:
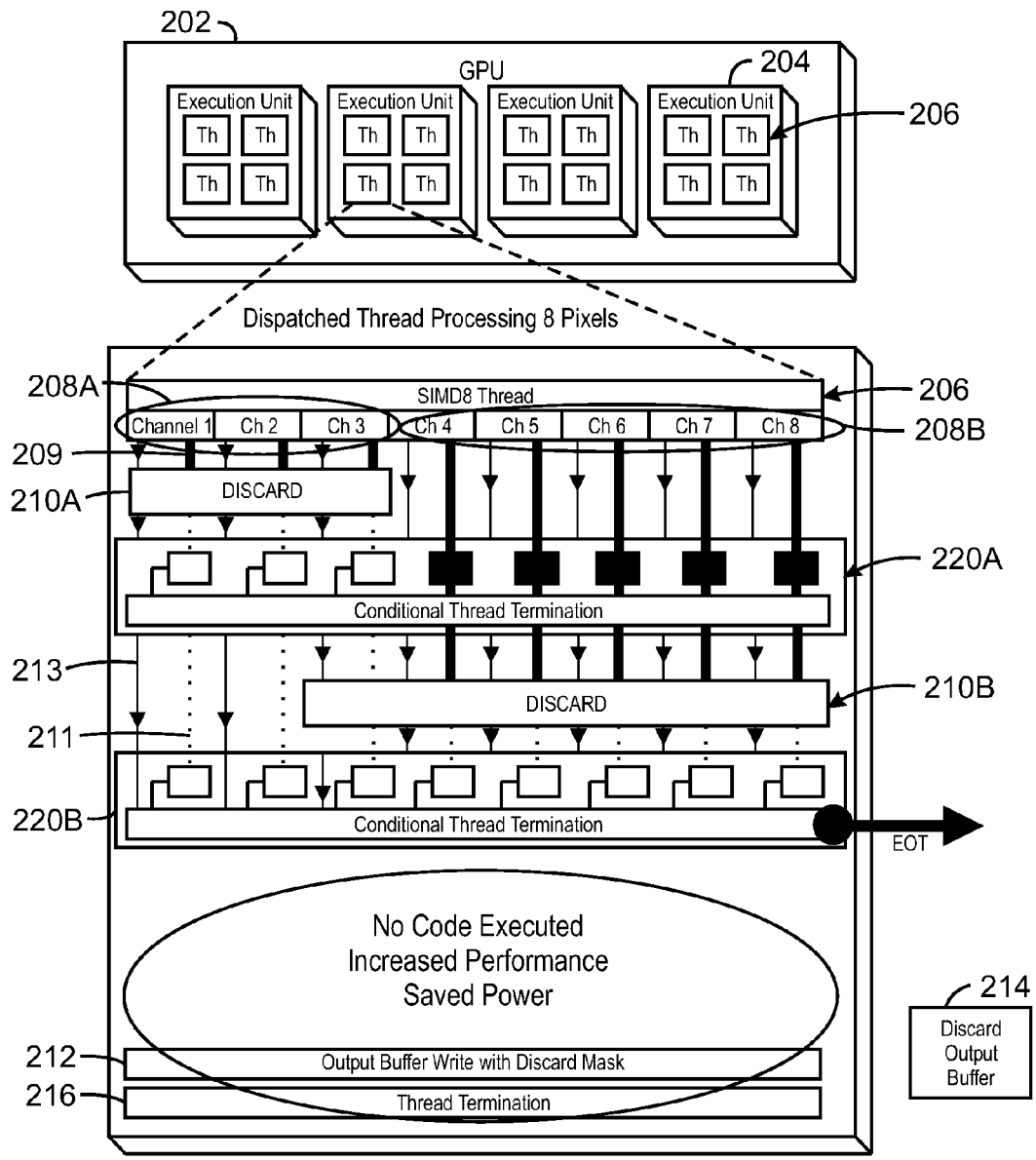
FIG. 2B is a diagram showing a manner of discarding pixels with a conditional end of thread termination, in accordance with an embodiment.

FIG. 2B is a diagram 250 showing a manner of discarding pixels with a conditional end of thread termination 220, in accordance with an embodiment. The diagram 250 includes the GPU 202 with the plurality of execution units 204 that includes the plurality of threads 206. Each thread processes eight pixels 208. The diagram 250 also includes solid lines 209, dotted lines 211, and solid thin lines with inverted triangles 213 that correspond to each of the pixels 208A and pixels 208B as described with respect to FIG. 2A.

Similar to FIG. 2A, the pixels 208A are discarded by a Discard Instruction 210A. The Discard Instruction 210A is followed by a conditional end of thread termination 220A. The processing of the pixels 208A, as represented by solid thin lines with inverted triangles 213, is not stopped by the Discard Instruction 210A. Accordingly, the solid thin lines with inverted triangles 213 occur both before and after the Discard Instruction 210A for the pixels 208A. Further, the pixels 208A are not terminated by the conditional end of thread termination 220A, as all pixels of the thread 206A have not been discarded. Specifically, the pixels 208B have not been discarded at the first conditional end of thread termination 220A.

As illustrated by the dotted lines 211 for the pixels 208A and the solid lines 209 for the pixels 208B after the conditional end of thread termination 220A, all pixels 208A and pixels 208B are processed until the Discard Instruction 210B, regardless of their status. The dotted lines 211 that correspond to each of the pixels 208A indicates the status of the pixel data as not being written to a buffer. Each solid thin line with inverted triangles 213 that correspond to each of the pixels 208A indicates the pixels 208A are processed after the conditional end of thread termination 220A.

After the Discard Instruction 210B, the processing represented by thin line with inverted triangles 213 for the pixels 208B is terminated by another conditional end of thread termination 220B. After the conditional end of thread termination 220B, all pixels 208A and pixels 208B have been discarded. Since all pixels 208A and pixels 208B have been discarded, the conditional end of thread termination is executed and no further computations are in the thread 206A after the conditional end of thread termination 220B. This is indicated in FIG. 2B by the lack of dotted lines 211 and solid thin lines with inverted triangles 213 after the conditional end of thread termination 220B.

In some examples, one Discard Instruction may cause all pixels of a thread to be discarded. In such a scenario, the conditional end of thread termination will cause the termination of processing of all pixels in the thread. The conditional end of thread termination will not terminate the processing of pixels within a thread until all pixels of a thread have been discarded using a Discard Instruction. In some embodiments, a shader compiler is used to inject code that includes the conditional end of thread instructions into the shader. Additionally, in some embodiments, the shader compiler injects additional verification code into the shader before each end of thread termination. The verification code verifies the status of the pixels prior to the conditional end of thread instruction. If all pixels of a thread have not been discarded, then the verification code does not allow process flow of the thread to proceed to the conditional end of thread termination. However, if all of the pixels of a thread have been discarded, the verification code enables process flow of the thread to proceed to the conditional end of thread termination. In this manner, the verification code can be used to ensure that a thread is not prematurely terminated due to the execution of an inserted conditional end of thread instruction. Furthermore, when the thread includes additional writes to other buffers, the verification code will prevent the conditional end of thread instruction from executing until the additional writes to the other buffers are complete. In this manner, all other buffers, processes, and threads that obtain data from a thread with a conditional end of thread termination can receive that data before the thread is terminated. Accordingly, the verification code can verify the status of the pixels and that the pixels are not written to any other buffer.

Figure 3:
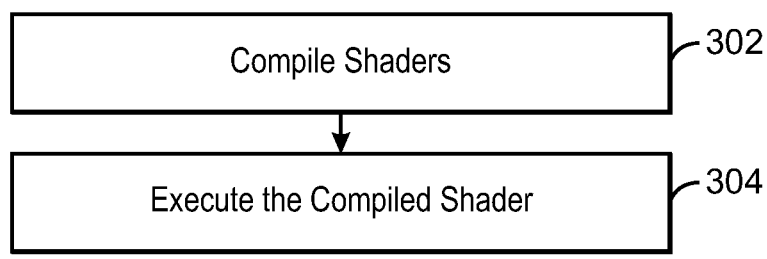
FIG. 3 is process flow diagram of a method to insert a conditional thread termination, in accordance with an embodiment.

FIG. 3 is process flow diagram of a method 300 to insert a conditional thread termination, in accordance with an embodiment. At block 302, the shader is compiled. In embodiments, the shader is compiled by a shader compiler that is part of a graphics driver of a computing system. In some embodiments, the shader is compiled to be executed on an SIMD-based architecture. The compilation of the shader includes the injection of a conditional a conditional thread termination after each Discard Instruction and write instruction. Compiling the shader may also includes injecting verification code before each conditional end of thread instruction, wherein the verification code is to verify the status of the pixels as discussed above. In embodiments, the status of the discarded pixels is verified after each of the plurality of pixels is discarded.

At block 304, the compiled shader is executed. During execution, a thread is terminated by the conditional end of thread instruction if all pixels of the thread are discarded and the thread does not write any pixels to another buffer. The status of the pixels may be verified, and the conditional end of thread instruction is to not execute if all pixels of the thread are not discarded and the thread writes any pixels to another buffer after the conditional end of thread instruction. By terminating a thread, the conditional end of thread instruction is to omit execution of all further computations of the thread if all pixels of the thread are discarded and the thread does not write any pixels to another buffer after the conditional end of thread instruction. In this manner, the processor does not waste processing time on the discarded pixels, and power can be saved as a result of not processing the discarded pixels.

Figure 4:
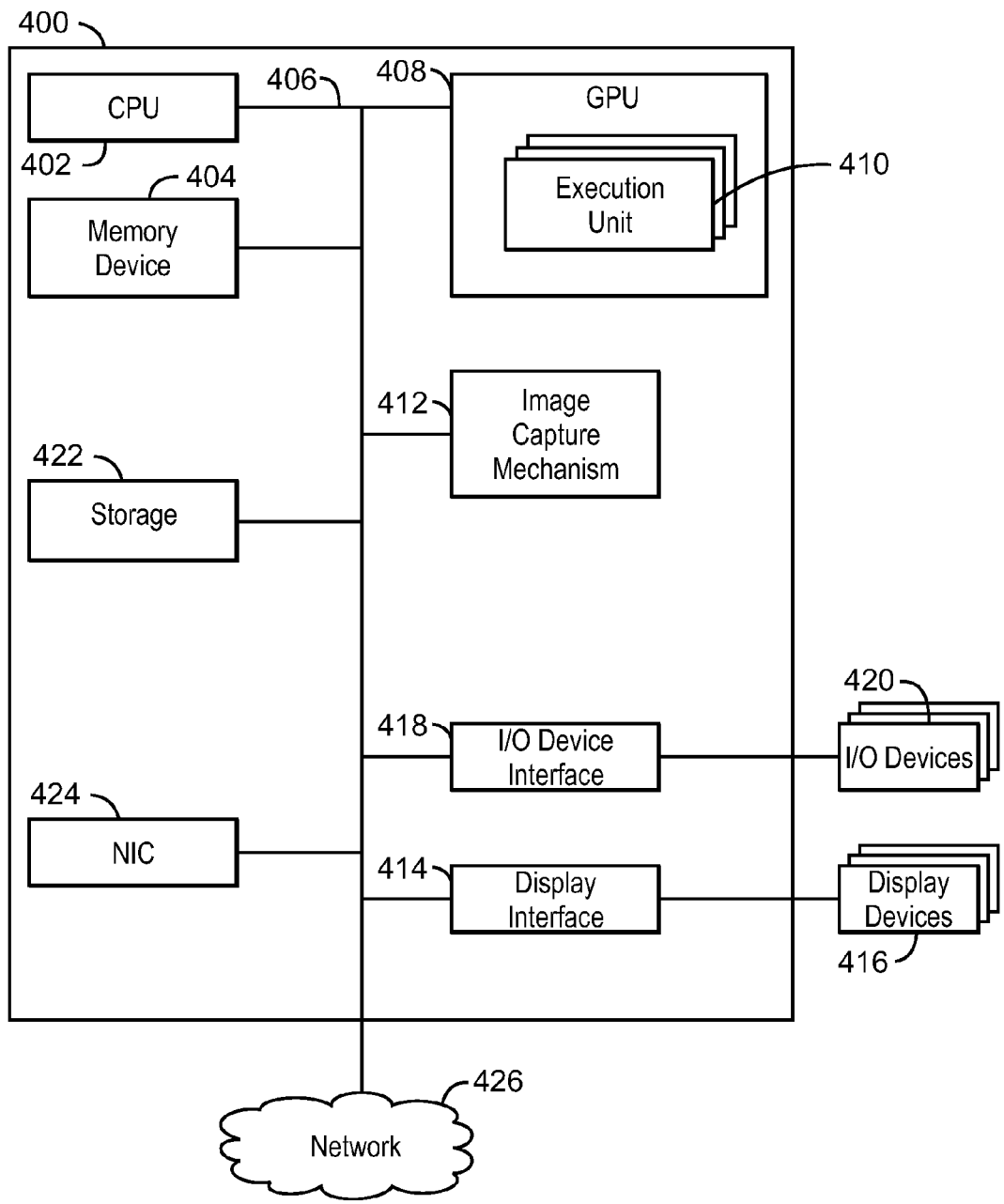
FIG. 4 is a block diagram of a computing device that may be used for a conditional end of thread mechanism, in accordance with an embodiment.

FIG. 4 is a block diagram of a computing device 400 that may be used for a conditional end of thread mechanism, in accordance with an embodiment. The computing device 400 may be, for example, a laptop computer, desktop computer, ultrabook, tablet computer, mobile device, or server, among others. The computing device 400 may include a central processing unit (CPU) 402 that is configured to execute stored instructions, as well as a memory device 404 that stores instructions that are executable by the CPU 402. The CPU may be coupled to the memory device 404 by a bus 406. Additionally, the CPU 402 can be a single core processor, a multi-core processor, a computing cluster, or any number of other configurations. Furthermore, the computing device 400 may include more than one CPU 402.

The computing device 400 may also include a graphics processing unit (GPU) 408. As shown, the CPU 402 may be coupled through the bus 406 to the GPU 408. The GPU 408 may be configured to perform any number of graphics operations within the computing device 400. For example, the GPU 408 may be configured to render or manipulate graphics images, graphics frames, videos, or the like, to be displayed to a user of the computing device 400. The GPU 408 includes a plurality of execution units 410. The executions units 410 may process threads from any number of graphics operations.

The memory device 404 can include random access memory (RAM), read only memory (ROM), flash memory, or any other suitable memory systems. For example, the memory device 404 may include dynamic random access memory (DRAM). The computing device 400 includes an image capture mechanism 412. In some embodiments, the image capture mechanism 412 is a camera, stereoscopic camera, scanner, infrared sensor, or the like.

The CPU 402 may be linked through the bus 406 to a display interface 414 configured to connect the computing device 400 to a display device 416. The display device 416 may include a display screen that is a built-in component of the computing device 400. The display device 416 may also include a computer monitor, television, or projector, among others, that is externally connected to the computing device 400.

The CPU 402 may also be connected through the bus 406 to an input/output (I/O) device interface 418 configured to connect the computing device 400 to one or more I/O devices 420. The I/O devices 420 may include, for example, a keyboard and a pointing device, wherein the pointing device may include a touchpad or a touchscreen, among others. The I/O devices 420 may be built-in components of the computing device 400, or may be devices that are externally connected to the computing device 400.

The computing device also includes a storage device 422. The storage device 422 is a physical memory such as a hard drive, an optical drive, a thumbdrive, an array of drives, or any combinations thereof. The storage device 422 may also include remote storage drives. The computing device 400 may also include a network interface controller (NIC) 424 may be configured to connect the computing device 400 through the bus 406 to a network 426. The network 426 may be a wide area network (WAN), local area network (LAN), or the Internet, among others.

The block diagram of FIG. 4 is not intended to indicate that the computing device 400 is to include all of the components shown in FIG. 4. Further, the computing device 400 may include any number of additional components not shown in FIG. 4, depending on the details of the specific implementation.

Figure 5:
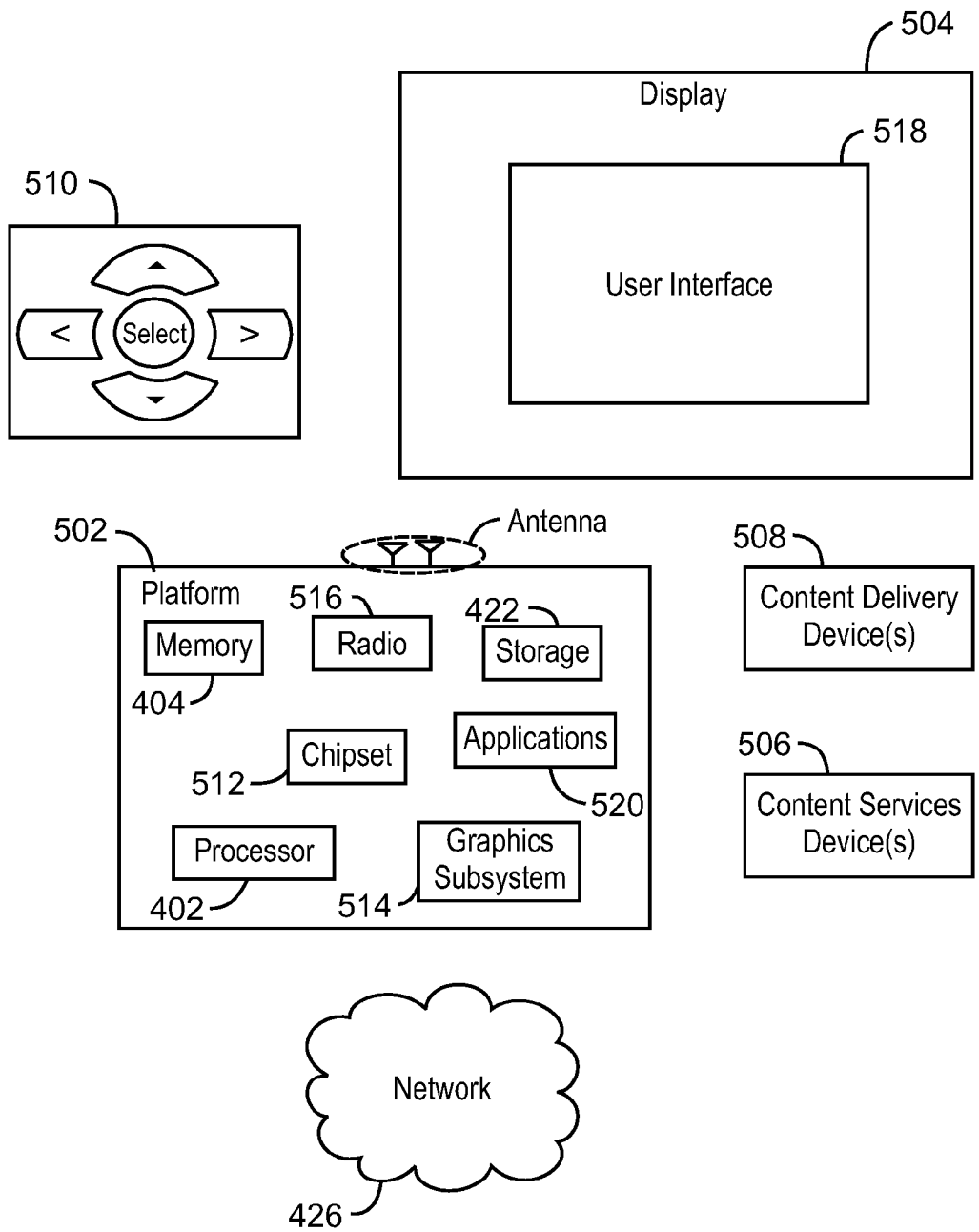
FIG. 5 is a block diagram of an exemplary system that executes a conditional end of thread mechanism, in accordance with an embodiment.

FIG. 5 is a block diagram of an exemplary system 500 that executes a conditional end of thread mechanism, in accordance with an embodiment. Like numbered items are as described with respect to FIG. 4. In some embodiments, the system 500 is a media system. In addition, the system 500 may be incorporated into a personal computer (PC), laptop computer, ultra-laptop computer, server computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, a printing device, an embedded device or the like.

In various embodiments, the system 500 comprises a platform 502 coupled to a display 504. The platform 502 may receive content from a content device, such as content services device(s) 506 or content delivery device(s) 508, or other similar content sources. A navigation controller 510 including one or more navigation features may be used to interact with, for example, the platform 502 and/or the display 504. Each of these components is described in more detail below.

The platform 502 may include any combination of a chipset 512, a central processing unit (CPU) 402, a memory device 404, a storage device 422, a graphics subsystem 514, applications 520, and a radio 516. The chipset 512 may provide intercommunication among the CPU 402, the memory device 404, the storage device 422, the graphics subsystem 514, the applications 520, and the radio 516. For example, the chipset 512 may include a storage adapter (not shown) capable of providing intercommunication with the storage device 422.

The CPU 402 may be implemented as Complex Instruction Set Computer (CISC) or Reduced Instruction Set Computer (RISC) processors, x86 instruction set compatible processors, multi-core, or any other microprocessor or central processing unit (CPU). In some embodiments, the CPU 402 includes multi-core processor(s), multi-core mobile processor(s), or the like. The memory device 404 may be implemented as a volatile memory device such as, but not limited to, a Random Access Memory (RAM), Dynamic Random Access Memory (DRAM), or Static RAM (SRAM). The storage device 422 may be implemented as a non-volatile storage device such as, but not limited to, a magnetic disk drive, optical disk drive, tape drive, solid state drive, an internal storage device, an attached storage device, flash memory, battery backed-up SDRAM (synchronous DRAM), and/or a network accessible storage device. In some embodiments, the storage device 422 includes technology to increase the storage performance enhanced protection for valuable digital media when multiple hard drives are included, for example.

The graphics subsystem 514 may perform processing of images such as still or video for display. The graphics subsystem 514 may include a graphics processing unit (GPU), such as the GPU 408, or a visual processing unit (VPU), for example. An analog or digital interface may be used to communicatively couple the graphics subsystem 514 and the display 504. For example, the interface may be any of a High-Definition Multimedia Interface, DisplayPort, wireless HDMI, and/or wireless HD compliant techniques. The graphics subsystem 514 may be integrated into the CPU 402 or the chipset 512. Alternatively, the graphics subsystem 514 may be a stand-alone card communicatively coupled to the chipset 512.

The graphics and/or video processing techniques described herein may be implemented in various hardware architectures. For example, graphics and/or video functionality may be integrated within the chipset 512. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

The radio 516 may include one or more radios capable of transmitting and receiving signals using various suitable wireless communications techniques. Such techniques may involve communications across one or more wireless networks. Exemplary wireless networks include wireless local area networks (WLANs), wireless personal area networks (WPANs), wireless metropolitan area network (WMANs), cellular networks, satellite networks, or the like. In communicating across such networks, the radio 516 may operate in accordance with one or more applicable standards in any version.

The display 504 may include any television type monitor or display. For example, the display 504 may include a computer display screen, touch screen display, video monitor, television, or the like. The display 504 may be digital and/or analog. In some embodiments, the display 504 is a holographic display. Also, the display 504 may be a transparent surface that may receive a visual projection. Such projections may convey various forms of information, images, objects, or the like. For example, such projections may be a visual overlay for a mobile augmented reality (MAR) application. Under the control of one or more applications 520, the platform 502 may display a user interface 518 on the display 504.

The content services device(s) 506 may be hosted by any national, international, or independent service and, thus, may be accessible to the platform 502 via the Internet, for example. The content services device(s) 506 may be coupled to the platform 502 and/or to the display 504. The platform 502 and/or the content services device(s) 506 may be coupled to a network 426 to communicate (e.g., send and/or receive) media information to and from the network 426. The content delivery device(s) 508 also may be coupled to the platform 502 and/or to the display 504.

The content services device(s) 506 may include a cable television box, personal computer, network, telephone, or Internet-enabled device capable of delivering digital information. In addition, the content services device(s) 506 may include any other similar devices capable of unidirectionally or bidirectionally communicating content between content providers and the platform 502 or the display 504, via the network 426 or directly. It will be appreciated that the content may be communicated unidirectionally and/or bidirectionally to and from any one of the components in the system 500 and a content provider via the network 426. Examples of content may include any media information including, for example, video, music, medical and gaming information, and so forth.

The content services device(s) 506 may receive content such as cable television programming including media information, digital information, or other content. Examples of content providers may include any cable or satellite television or radio or Internet content providers, among others.

In some embodiments, the platform 502 receives control signals from the navigation controller 510, which includes one or more navigation features. The navigation features of the navigation controller 510 may be used to interact with the user interface 518, for example. The navigation controller 510 may be a pointing device or a touchscreen device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures. Physical gestures include but are not limited to facial expressions, facial movements, movement of various limbs, body movements, body language or any combinations thereof. Such physical gestures can be recognized and translated into commands or instructions.

Movements of the navigation features of the navigation controller 510 may be echoed on the display 504 by movements of a pointer, cursor, focus ring, or other visual indicators displayed on the display 504. For example, under the control of the applications 520, the navigation features located on the navigation controller 510 may be mapped to virtual navigation features displayed on the user interface 518. In some embodiments, the navigation controller 510 may not be a separate component but, rather, may be integrated into the platform 502 and/or the display 504.

The system 500 may include drivers (not shown) that include technology to enable users to instantly turn on and off the platform 502 with the touch of a button after initial boot-up, when enabled, for example. Program logic may allow the platform 502 to stream content to media adaptors or other content services device(s) 506 or content delivery device(s) 508 when the platform is turned "off." In addition, the chipset 512 may include hardware and/or software support for 5.1 surround sound audio and/or high definition 7.1 surround sound audio, for example. The drivers may include a graphics driver for integrated graphics platforms. In some embodiments, the graphics driver includes a peripheral component interconnect express (PCIe) graphics card.

In various embodiments, any one or more of the components shown in the system 500 may be integrated. For example, the platform 502 and the content services device(s) 506 may be integrated; the platform 502 and the content delivery device(s) 508 may be integrated; or the platform 502, the content services device(s) 506, and the content delivery device(s) 508 may be integrated. In some embodiments, the platform 502 and the display 504 are an integrated unit. The display 504 and the content service device(s) 506 may be integrated, or the display 504 and the content delivery device(s) 508 may be integrated, for example.

The system 500 may be implemented as a wireless system or a wired system. When implemented as a wireless system, the system 500 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum. When implemented as a wired system, the system 500 may include components and interfaces suitable for communicating over wired communications media, such as input/output (I/O) adapters, physical connectors to connect the I/O adapter with a corresponding wired communications medium, a network interface card (NIC), disc controller, video controller, audio controller, or the like. Examples of wired communications media may include a wire, cable, metal leads, printed circuit board (PCB), backplane, switch fabric, semiconductor material, twisted-pair wire, co-axial cable, fiber optics, or the like.

The platform 502 may establish one or more logical or physical channels to communicate information. The information may include media information and control information. Media information may refer to any data representing content meant for a user. Examples of content may include, for example, data from a voice conversation, videoconference, streaming video, electronic mail (email) message, voice mail message, alphanumeric symbols, graphics, image, video, text, and the like. Data from a voice conversation may be, for example, speech information, silence periods, background noise, comfort noise, tones, and the like. Control information may refer to any data representing commands, instructions or control words meant for an automated system. For example, control information may be used to route media information through a system, or instruct a node to process the media information in a predetermined manner. The embodiments, however, are not limited to the elements or the context shown or described in FIG. 5.

Figure 6:
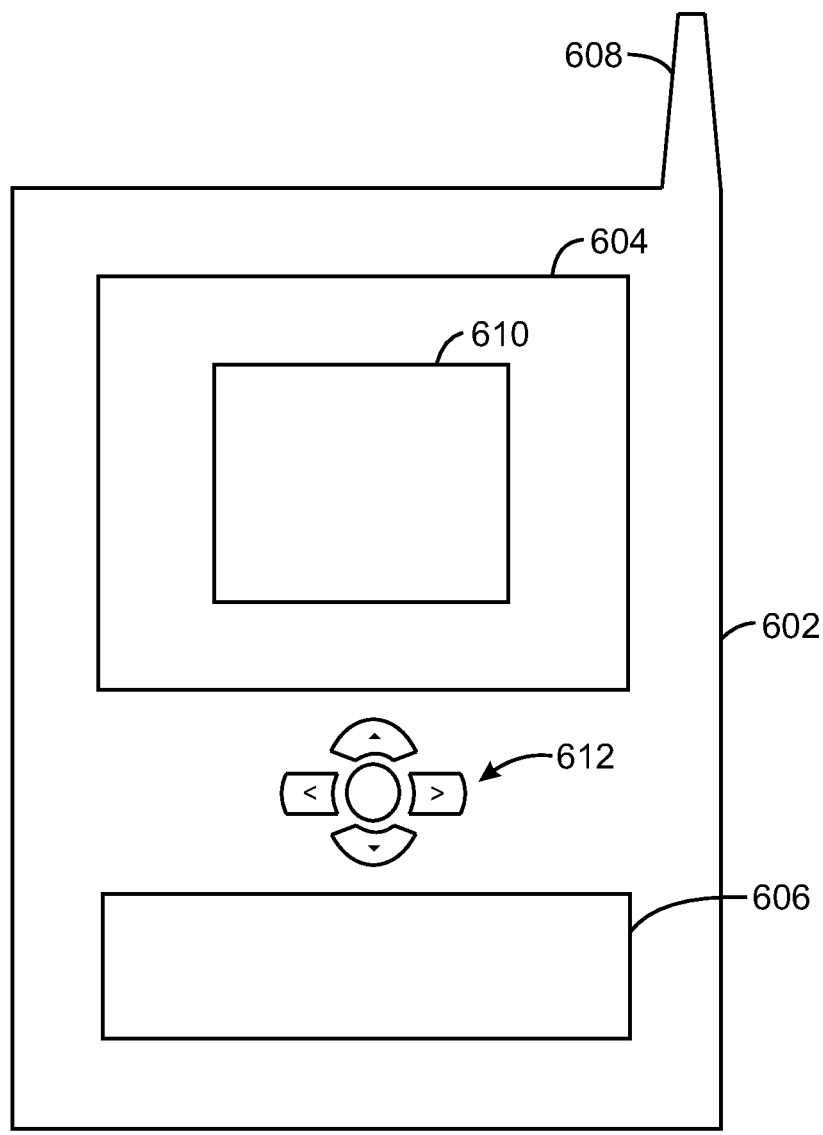
FIG. 6 is a schematic of a small form factor device in which the system of FIG. 5 may be embodied, in accordance with an embodiment.

FIG. 6 is a schematic of a small form factor device 600 in which the system 500 of FIG. 5 may be embodied, in accordance with an embodiment. Like numbered items are as described with respect to FIG. 5. In some embodiments, for example, the device 600 is implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, server computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and the like.

An example of a mobile computing device may also include a computer that is arranged to be worn by a person, such as a wrist computer, finger computer, ring computer, eyeglass computer, belt-clip computer, arm-band computer, shoe computer, clothing computer, or any other suitable type of wearable computer. For example, the mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wired or wireless mobile computing devices as well.

As shown in FIG. 6, the device 600 may include a housing 602, a display 604, an input/output (I/O) device 606, and an antenna 608. The device 600 may also include navigation features 612. The display 604 may include any suitable display 610 unit for displaying information appropriate for a mobile computing device. The I/O device 606 may include any suitable I/O device for entering information into a mobile computing device. For example, the I/O device 606 may include an alphanumeric keyboard, a numeric keypad, a touch pad, input keys, buttons, switches, rocker switches, microphones, speakers, a voice recognition device and software, or the like. Information may also be entered into the device 600 by way of microphone. Such information may be digitized by a voice recognition device.

Figure 7:
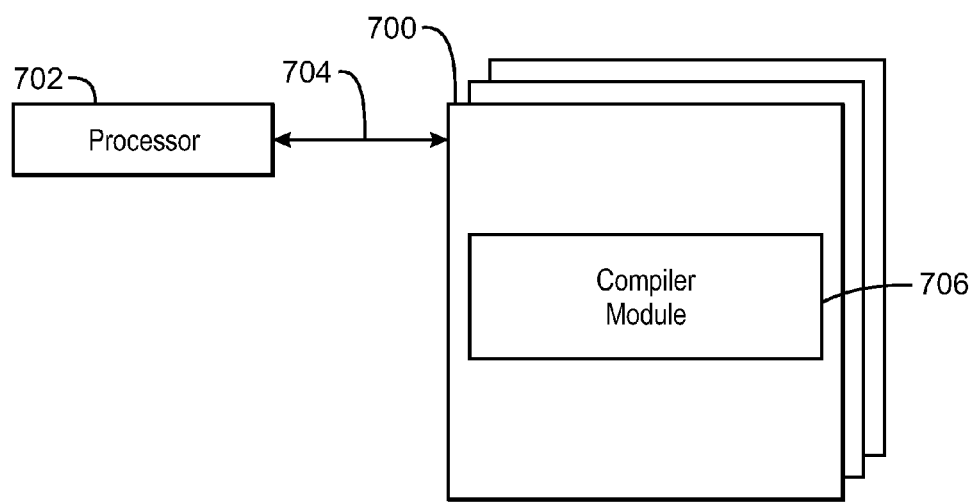
FIG. 7 is a block diagram showing tangible, non-transitory computer-readable media that stores code for a conditional end of thread mechanism.

FIG. 7 is a block diagram showing tangible, non-transitory computer-readable media 700 that stores code for a conditional end of thread mechanism. The tangible, non-transitory computer-readable media 700 may be accessed by a processor 702 over a computer bus 704. Furthermore, the tangible, non-transitory computer-readable medium 700 may include code configured to direct the processor 702 to perform the methods described herein.

The various software components discussed herein may be stored on one or more tangible, non-transitory computer-readable media 700, as indicated in FIG. 7. For example, a compiler module 706 may be configured to compile a shader. The compiler module may also be configured to inject verification code after a Discard Instruction within the shader, and inject a conditional end of thread instruction, wherein the conditional end of thread instruction terminates processing of all pixels.

The block diagram of FIG. 7 is not intended to indicate that the tangible, non-transitory computer-readable media 700 is to include all of the components shown in FIG. 7. Further, the tangible, non-transitory computer-readable media 700 may include any number of additional components not shown in FIG. 7, depending on the details of the specific implementation.

Example 1

A graphics processing unit is described herein. The graphics processing unit includes at least one execution unit, the execution unit configured to execute a shader. The shader includes at least one thread that causes the execution unit to process a plurality of pixels until each of the plurality of pixels are discarded and until the last write instruction is executed. The shader also includes instructions that cause the execution unit to execute a conditional end of thread instruction after each of the plurality of pixels are discarded and after no the last write instruction is executed, wherein the conditional end of thread instruction terminates the thread.

The plurality of pixels may be discarded by executing one Discard Instruction. The plurality of pixels may also be discarded by executing a plurality of Discard Instructions, wherein each Discard Instruction discards a portion of the plurality of pixels. The status of the discarded pixels is verified after each of the plurality of pixels is discarded. The discarded pixels are not written to a Render Target buffer in DirectX or a Color Attachment Buffer in OpenGL. The last write instruction includes other writes of the plurality of pixels are writes to any buffer other than a Render Target buffer in DirectX or a Color Attachment Buffer in OpenGL. The conditional end of thread instruction is to prevent execution of all further computations of the thread by the execution unit when all pixels are discarded and after no other writes of the plurality of pixels are to be performed after the conditional end of thread instruction. Performance of the graphics processing unit is increased and power is saved by the termination of the thread after each of the plurality of pixels are discarded and the last write instruction is executed.

Example 2

A method is described herein. The method includes compiling a shader, wherein compiling the shader includes injecting a conditional end of thread instruction into the shader after each Discard Instruction and the last write instruction. The method also includes executing the compiled shader, wherein a thread is terminated by the conditional end of thread instruction if all pixels of the thread are discarded and the thread does not write any pixels to another buffer.

Compiling the shader also includes injecting verification code before each conditional end of thread instruction, wherein the verification code is to verify the status of the pixels. Executing the compiled shader also includes verifying the status of the pixels such that the conditional end of thread instruction is to not execute if all pixels of the thread are not discarded and the thread writes any pixels to another buffer after the conditional end of thread instruction. The Discard Instruction is to indicate that no data will be written to a Render Target buffer in DirectX or a Color Attachment Buffer in OpenGL. Termination of the thread by the conditional end of thread instruction is to omit execution of all further computations of the thread if all pixels of the thread are discarded and the thread does not write any pixels to another buffer after the conditional end of thread instruction.

Example 3

A tangible, non-transitory, computer-readable medium is described herein. The tangible, non-transitory, computer-readable medium includes code to direct a processor to compile a shader, wherein a compiler is to inject a conditional end of thread instruction into the shader after each Discard Instruction and write instruction. Additionally, the compiler is to inject verification code before each conditional end of thread instruction into the shader, wherein the verification code is to verify the status of a plurality of pixels. If the status of each of the plurality of pixels is discarded and the plurality of pixels is not written to any other buffer, the conditional end of thread instruction is to execute. The Discard Instruction is to indicate that no data will be written to a Render Target buffer in DirectX or a Color Attachment Buffer in OpenGL. Further, the conditional end of thread instruction is to instruct that all further computations of a thread are to terminate if all pixels of the thread are discarded and the thread does not write any pixels to another buffer after the conditional end of thread instruction. Power is saved by the termination of a thread by the conditional end of thread instruction after each of a plurality of pixels are discarded and after no other writes of the plurality of pixels are to be executed.

Example 4

A system that includes a conditional end of thread mechanism is described herein. The system includes a display, a radio, and a memory that is to store instructions and that is communicatively coupled to the display. The system also includes a processor communicatively coupled to the radio and the memory, When the processor is to execute the instructions, the processor is to process a plurality of pixels in parallel until each of the plurality of pixels are discarded and execution of a last write instruction, and execute a conditional end of thread instruction after each of the plurality of pixels is discarded and after execution of the last write instruction, wherein execution of the conditional end of thread instruction is to terminate the thread.

The processor may include an execution unit to execute the instructions. Additionally, the processor is an n-channel SIMD processing unit. The processor may also be graphics processing unit. The instructions may include a Discard Instruction, where execution of one Discard Instruction is to cause discard of the plurality of pixels. The instructions may also include a plurality of Discard Instructions, wherein execution of the plurality of Discard Instructions is to cause discard of the plurality of pixels, wherein execution of each Discard Instruction is to discard a portion of the plurality of pixels. The processor may verify a status of the discarded pixels after each of the plurality of pixels is discarded and after execution of the last write instruction.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the inventions are not limited to those diagrams or to corresponding descriptions herein. For example, flow need not move through each illustrated box or state or in exactly the same order as illustrated and described herein.

The inventions are not restricted to the particular details listed herein. Indeed, those skilled in the art having the benefit of this disclosure will appreciate that many other variations from the foregoing description and drawings may be made within the scope of the present inventions. Accordingly, it is the following claims including any amendments thereto that define the scope of the inventions.

What is claimed is:

1. A graphics processing unit, comprising:
   at least one execution unit, the execution unit configured to execute a shader, the shader comprising instructions that are to cause the execution unit to:
   process a plurality of pixel data in parallel until each of the plurality of pixel data is discarded and execution of a last write instruction; and
   execute a conditional end of thread instruction after each of the plurality of pixel data is discarded and after execution of the last write instruction, wherein execution of the conditional end of thread instruction is to terminate the thread wherein verification code is to be injected before each conditional end of thread instruction, wherein the verification code is to verify a status of the pixel data, and the status of the pixel data is verified such that the conditional end of thread instruction is to not execute if all pixel data of the thread are not discarded and the thread writes any pixel data to another buffer after the conditional end of thread instruction.

2. The graphics processing unit of claim 1, wherein the instructions comprise a Discard Instruction and wherein execution of one Discard Instruction is to cause discard of the plurality of pixel data.

3. The graphics processing unit of claim 1, wherein the instructions comprise a plurality of Discard Instructions and wherein execution of the plurality of Discard Instructions is to cause discard of the plurality of pixel data, wherein execution of each Discard Instruction is to discard a portion of the plurality of pixel data.

4. The graphics processing unit of claim 3, wherein the execution unit is to verify a status of the discarded pixel data after each of the plurality of pixel data is discarded and after execution of the last write instruction.

5. The graphics processing unit of claim 1, wherein the execution unit is not to cause discarded pixel data to be written to a Render Target buffer in DirectX or a Color Attachment Buffer in OpenGL.

6. The graphics processing unit of claim 1, wherein the last write instruction includes other writes of the plurality of pixel data and the other writes cause the execution unit to write to any buffer other than a Render Target buffer in DirectX or a Color Attachment Buffer in OpenGL.

7. The graphics processing unit of claim 1, wherein execution of the conditional end of thread instruction is to prevent execution of all further computations of the thread by the execution unit when each of the plurality of pixel data are discarded and after execution of the last write instruction after the conditional end of thread instruction.

8. The graphics processing unit of claim 1, wherein performance of the graphics processing unit is increased and power is saved by the termination of the thread after each of the plurality of pixel data are discarded and after no other writes of the plurality of pixel data are to be performed.

9. A method for a conditional end of thread mechanism, comprising:
  compiling a shader, wherein compiling the shader includes injecting a conditional end of thread instruction into the shader after each Discard Instruction and the last write instruction, wherein compiling the shader includes injecting verification code before each conditional end of thread instruction, wherein the verification code is to verify a status of the pixel data;
  executing the compiled shader, wherein a thread is terminated by the conditional end of thread instruction if all pixel data of the thread are discarded and the thread does not write any pixel data to another buffer after the conditional end of thread instruction, wherein executing the compiled shader includes verifying the status of the pixel data such that the conditional end of thread instruction is to not execute if all pixel data of the thread are not discarded and the thread writes any pixel data to another buffer after the conditional end of thread instruction.

10. The method of claim 9, wherein each Discard Instruction is to indicate that no data will be written to a Render Target buffer in DirectX or a Color Attachment Buffer in OpenGL.

11. The method of claim 9, wherein termination of the thread by the conditional end of thread instruction is to omit execution of all further computations of the thread if all pixel data of the thread are discarded and the thread does not write any pixel data to another buffer after the conditional end of thread instruction.

12. A tangible, non-transitory, computer-readable medium comprising code to direct a processor to:
  compile a shader, wherein a compiler is to inject a conditional end of thread instruction into the shader after each Discard Instruction and a last write instruction, and injecting verification code before each conditional end of thread instruction, wherein the verification code is to verify a status of the pixel data, and executing the compiled shader includes verifying the status of the pixel data such that the conditional end of thread instruction is to not execute if all pixel data of the thread are not discarded and the thread writes any pixel data to another buffer after the conditional end of thread instruction.

13. The computer-readable medium of claim 12, wherein the compiler is to inject verification code before each conditional end of thread instruction into the shader, wherein the verification code is to verify the status of a plurality of pixel data.

14. The computer-readable medium of claim 13, wherein if the status of each of the plurality of pixel data is discarded and the plurality of pixel data is not written to any other buffer, the conditional end of thread instruction is to execute.

15. The computer-readable medium of claim 12, wherein the Discard Instruction is to indicate that no data will be written to a Render Target buffer in DirectX or a Color Attachment Buffer in OpenGL.

16. The computer-readable medium of claim 12, wherein the conditional end of thread instruction is to instruct that all further computations of a thread are to terminate if all pixel data of the thread are discarded and the thread does not write any pixel data to another buffer after the conditional end of thread instruction.

17. The computer-readable medium of claim 12, wherein power is saved by the termination of a thread by the conditional end of thread instruction after each of a plurality of pixel data are discarded and after the last write instruction of the plurality of pixel data are to be executed.

18. A system that includes a conditional end of thread mechanism, comprising:
  a display;
  a radio;
  a memory that is to store instructions and that is communicatively coupled to the display; and
  a processor communicatively coupled to the radio and the memory, wherein when the processor is to execute the instructions, the processor is to:
    process a plurality of pixel data in parallel until each of the plurality of pixel data are discarded and execution of a last write instruction; and
    execute a conditional end of thread instruction after each of the plurality of pixel data is discarded and after execution of the last write instruction, wherein execution of the conditional end of thread instruction is to terminate the thread, wherein verification code is to be injected before each conditional end of thread instruction, wherein the verification code is to verify a status of the pixel data, and the status of the pixel data is verified such that the conditional end of thread instruction is to not execute if all pixel data of the thread are not discarded and the thread writes any pixel data to another buffer after the conditional end of thread instruction.

19. The system of claim 18, wherein the processor includes an execution unit to execute the instructions.

20. The system of claim 18, wherein the processor is an n-channel SIMD processing unit.

21. The system of claim 18, wherein the processor is a graphics processing unit.

22. The system of claim 18, wherein the instructions comprise a Discard Instruction and wherein execution of one Discard Instruction is to cause discard of the plurality of pixel data.

23. The system of claim 18, wherein the instructions comprise a plurality of Discard Instructions and wherein execution of the plurality of Discard Instructions is to cause discard of the plurality of pixel data, wherein execution of each Discard Instruction is to discard a portion of the plurality of pixel data.

24. The system of claim 21, wherein the processor is to verify a status of the discarded pixel data after each of the plurality of pixel data is discarded and after execution of the last write instruction.

* * * * *